United States Patent
Stone

[11] 3,814,497
[45] June 4, 1974

[54] LIQUID CORE MULTIMODE OPTICAL WAVEGUIDE

[75] Inventor: Julian Stone, Rumson, N.J.

[73] Assignee: Bell Telephone Laboratories, Incorporated, Murray Hill, N.J.

[22] Filed: Nov. 24, 1972

[21] Appl. No.: 309,275

Related U.S. Application Data

[63] Continuation-in-part of Ser. No. 183,869, Sept. 27, 1971, abandoned.

[52] U.S. Cl. .......................... 350/96 WG, 350/96 B
[51] Int. Cl. ............................................ G02b 5/16
[58] Field of Search ................. 350/96 WG, 179

[56] References Cited
UNITED STATES PATENTS

| | | | |
|---|---|---|---|
| 3,135,207 | 6/1964 | Brown et al. | 350/180 X |
| 3,386,787 | 6/1968 | Kaplan | 350/96 WG |
| 3,510,195 | 5/1970 | Noble | 350/179 X |
| 3,740,113 | 6/1973 | Cass | 350/96 R |

*Primary Examiner*—John K. Corbin
*Attorney, Agent, or Firm*—E. M. Fink

[57] ABSTRACT

Multimode optical waveguides have been fabricated using hollow fibers of either glass or fused quartz as the cladding and an organic liquid as the core. Transmission loss measurements with coherent light at 6328 A. and incoherent light at various wavelengths in the visible and near infrared have proven satisfactory and are comparable with those observed where the core material is a solid.

3 Claims, 5 Drawing Figures

3,814,497

LIQUID CORE MULTIMODE OPTICAL WAVEGUIDE

CROSS REFERENCE TO RELATED APPLICATION

This application is a continuation-in-part of my co-pending application, Ser. No. 183,869, filed Sept. 27, 1971, now abandoned.

BACKGROUND OF THE INVENTION

1. Field of the Invention

This invention relates to optical waveguides. More particularly, the present invention relates to multimode optical waveguides including a plurality of hollow fiber claddings having liquid cores wherein large numbers of elongated light transmitting elements are arranged in parallel formation and optically finished at their opposite ends so as to be positionable for transporting information or modulated light over long distances, typically ranging from a fraction of a kilometer to several thousand kilometers.

2. Description of the Prior Art

It has been known to use a plurality of light conducting elements arranged in closely spaced, generally parallel formation to each other to jointly serve as a device for conducting the light forming an optical image at an object plane to an image plane. Each of such light conducting elements works on the principle of internal reflection from the side walls thereof of most of the light which has entered at one end of the element and travels therethrough to the exit end of the element.

Unfortunately, such devices have not proven to be completely satisfactory, such being atributed primarily to poor light transmitting efficiency.

SUMMARY OF THE INVENTION

In accordance with the present invention, the prior art limitations are effectively obviated by means of an optical waveguide including a plurality of closely spaced parallel rods or filaments having a minimum length of at least five meters which are of predetermined indices of refraction, each of the filaments comprising a hollow core filled with an organic liquid having a higher refractive index than the refractive index of the rod, typically greater than 1.458. Transmission loss measurements made with coherent light at 6,328 A. and incoherent light at various wavelengths in the visible and near infrared have proven to be well within the range of interest for long distance transmission.

BRIEF DESCRIPTION OF THE DRAWINGS

The invention will be more readily understood by reference to the following detailed description taken in conjunction with the accompanying drawing wherein.

DETAILED DESCRIPTION OF THE INVENTION

Figure 1:
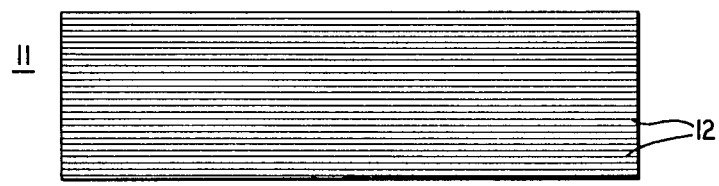
FIG. 1 is a front elevational view of an optical waveguide of the invention.
Figure 2:
FIG. 2 is an enlarged longitudinal section of a single rod or filament of the present invention.

With reference now more particularly to FIG. 1, there is shown an optical waveguide of the invention. Shown in the drawing is waveguide 11 comprising a plurality of closely spaced parallel rods or filaments 12. Each of these rods or filaments, as shown in FIG. 2, comprises a main body portion or core 13 comprising an organic liquid 14 manifesting satisfactory light conducting characteristics.

The rods or filaments are commonly referred to as cladding material and intentionally evidence a lower index of refraction than the core material so that the internal reflection of light traveling from, to and through the core will occur in the side wall surfaces of the core without entering or being adsorbed by the cladding. Rods 12 may suitably be selected from among hollow fibers obtained from conventional commercial sources, as for example, soda lime silicate flint glass ($n_D = 1.52$) or fused quartz ($n_D = 1.458$).

The size of each group of light conducting rods or filaments will depend upon the purpose for which the optical image supporting device is intended and the cross sectional area of the rods or filaments will depend upon the degree of resolution desired in the image being supported thereby. The opposite ends of each group of rods are preferably optically finished or polished so as to readily accept light incident thereon and means are provided at one end of the device to emit the light to means adjacent the opposite end. However, it will be appreciated that in the practice of the present invention, the length of the fibers employed may range from at least five meters to several thousand kilometers (5,000) and greater, such being suitable for long distance transmission as contemplated herein.

The core 14 comprises an organic liquid manifesting a higher index of refraction than the cladding, typically greater than 1.458. These organic compounds may be selected from the group consisting of (a) 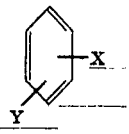

where $x$ and $y$ are selected from the group consisting of fluorine, chlorine, bromine and hydrogen, (b) perhalogenated hydrocarbons, (c) deuterated compositions of (a) and (d) mixtures thereof. Particularly useful compositions in this group are bromobenzene ($n_D = 1.560$), o-dichlorobenzene ($n_D = 1.549$), hexachlorobutadiene ($n_D = 1.55$) and tetrachloroethylene ($n_D = 1.505$). Studies have revealed that the foregoing compositions are efficacious not only in conjunction with hollow glass fibers but also in the case of a quartz cladding. It has also been determined that in conjunction with quartz claddings, mixtures of carbon tetrachloride in combination with low loss organic materials of the type described above are particularly useful, such liquids being used in any proportion of the total weight of the mixture. It will also be appreciated that mixtures of compositions evidencing an index of refraction in excess of 1.458 are also suitable even if one component has an $n_D$ greater than 1.458.

Examples of the present invention are described in detail below. The examples are included merely to aid in the understanding of the invention. Variations may be made by one skilled in the art without departing from the spirit and scope of the invention.

Example I

The hollow glass fibers selected were made from flint glass tubing having a 16 millimeter outer diameter and a wall thickness of 1.3 millimeter and a refractive index of 1.52. The tubing was pulled in an air ambient on a fiber pulling machine in lengths of about 50 meters and outer diameters of about 0.005 inch on 10.5 inch diameter aluminum drums wound at 100 turns per inch.

The organic liquids selected were bromobenzene and o-dichlorobenzene. The liquids were purified by distillation and the hollow fibers were filled under hydrostatic pressure in a monel cell with a Teflon plunger. The distillation process eliminated most of the dirt and the hydrostatic filling process permitted filling the fibers without the introduction of air bubbles. The filling cell was adapted with a quartz window which permitted the insertion of light into the fiber and which was held in place by passing it through a hypodermic needle which was then attached to a luer-lock hypodermic syringe chrome plated fitting attachment to the filling cell. The fiber was attached to the end of the hypodermic needle by means of a epoxy adhesive. Fifty meters of fiber were filled in less than 30 minutes and the described configuration served for injecting light for loss measurements.

Figure 3:
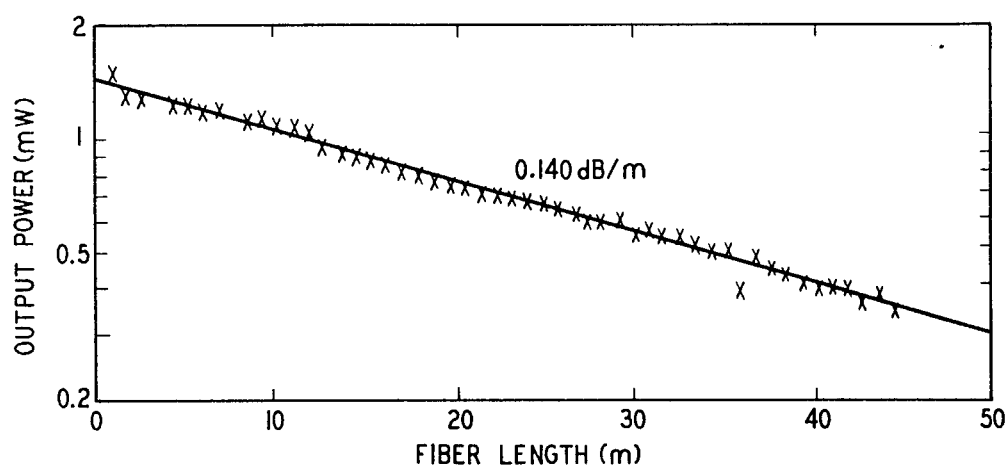
FIG. 3 is a graphical representation on coordinates of fiber length in meters against power output in milliwatts showing transmission losses for 0.005 inch outer diameter hollow glass fiber filled with bromobenzene utilizing a helium neon laser at 6,328 A.

Loss measurements were made at 6,328 A. using a helium neon laser operating at about 3.5 mW single transverse mode. Light was focused into the fiber with a 5× microscope objective. The output end of the fiber was immersed in a cell containing the same liquid as the core and the emerging light beam passed through a glass window and fell on the detector of a light meter (Coherent Radiation Labs Model 212). The immersion of the fiber end permitted the light energy in the glass cladding to refract out so that the light falling on the detector is that which has travelled in the core. The output level of the fiber was then measured as a function of fiber length by breaking off successive pieces from the fiber end. The results are shown graphically in FIG. 3 on coordinates of fiber length in meters against output power in milliwatts. The measured loss in the fiber was 0.140 db/m.

Figure 4:
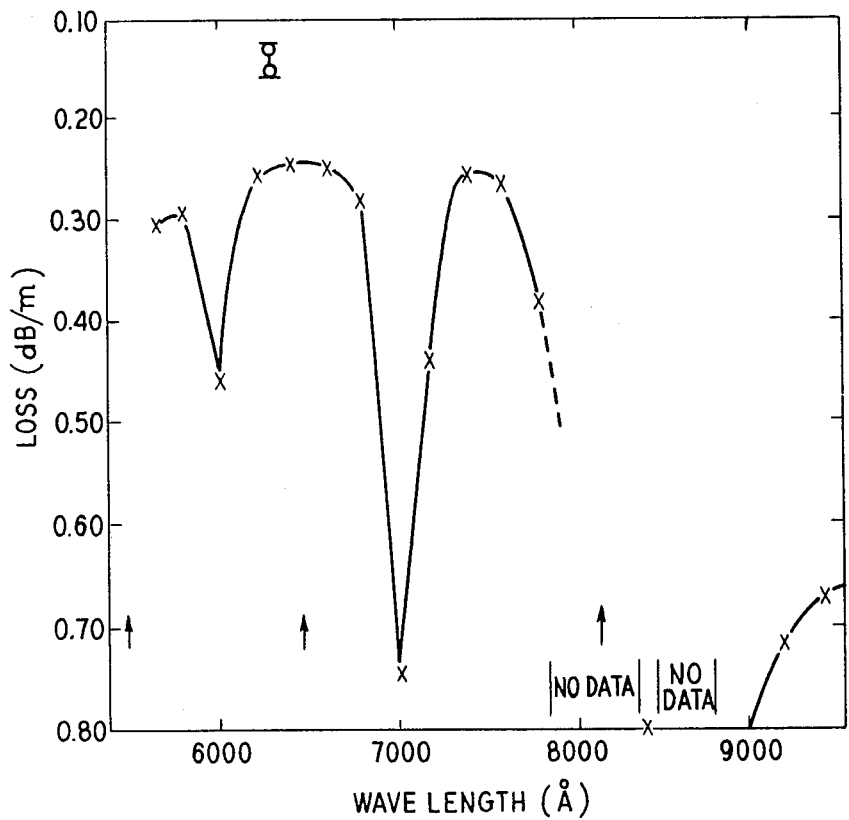
FIG. 4 is a graphical representation on coordinates of wavelength against loss in db/meter for a fiber similar to that described graphically in FIG. 3.

In a similar manner, measurements were made with incoherent light from a high power Xenon arc source (osram XB0450 lamp) using a set of 100 A. bandpass filters at a number of wavelengths between 5,600 and 9,400 A. In this case, the power was measured for the full length of the fiber and for a 4 meter length of the same fiber after breaking off a 38 meter piece. The results are shown graphically in FIG. 4 on coordinates of wavelength against loss in db/meter. In analyzing FIG. 4, the sharp adsorption lines at about 6,000 A., 7,000 A. and 8,800 A. may be attributed to overtones of strong carbon-hydrogen vibrational lines in bromobenzene at 3,069 $cm^{-1}$. The overtones of this line are shown as vertical arrows in FIG. 4. A similar line structure was obtained when a fiber was filled with o-dichlorobenzene as a corresponding absorption line at 3,071 $cm^{-1}$. The average loss at 6,328 A. was estimated to be between 0.125 and 0.150 db/m, considerably below the value of about 0.24 db/m at the same wavelength for incoherent light, the higher loss for incoherent light being attributed to a larger proportion of higher order modes which have higher loss due to waveguide imperfections at the core-cladding interface.

Example II

The procedure of Example I was repeated using fused quartz ($n_D$ = 1.458) hollow fibers as the cladding and a mixture of carbon tetrachloride and 20 percent by weight of the mixture of chlorobenzene. The measured loss in the fiber described was 0.040 db/m at 6,328 A.

The characteristic sought in the present invention is low absorption in the region of interest and is evidenced by an infrared spectrum without strong lines or with strong lines as far out in the infrared as possible. Studies have shown that deuterating (by any conventional technique) the organic liquids utilized moves the fundamentals due to carbon-hydrogen vibrations from 3 to 4.3 microns. This results in higher order, hence weaker, overtones in the spectral region of interest.

Example III

The procedure of Example II was repeated using tetrachloroethylene as the core material in 460 meter length fibers. The measured loss in the fiber described was 13.5 db/km at 1.08$\mu$.

Figure 5:
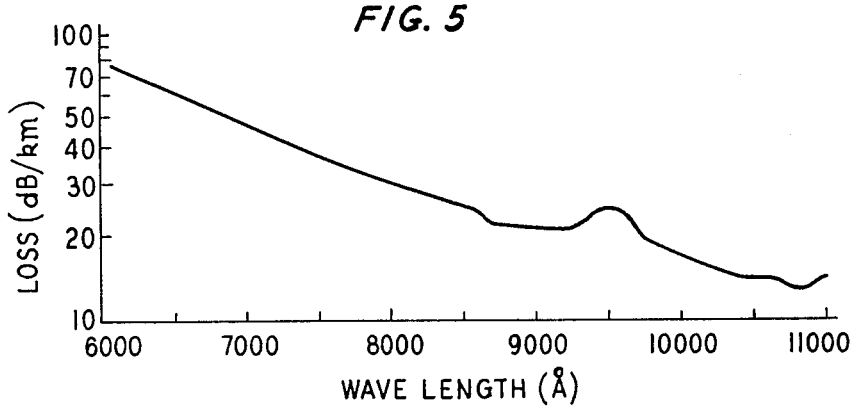
FIG. 5 is a graphical representation on coordinates of wavelength in Angstroms against loss in db/km for fused quartz fibers filled with tetrachloroethylene showing transmission losses at various wavelengths.

With reference now to FIG. 5, there is shown a graphical representation on coordinates of wavelength in Angstroms against loss in db/km for tetrachloroethylene filled hollow fused quartz fibers 460 meters in length at various wavelengths. It should be noted that losses less than 20 db/km (range of interest for long distance transmission) are observed from around 9,000 to 11,000 A, that area in which the most useful commercial light sources are available.

What is claimed is:

1. Multimode optical waveguide for long distance transmission including a plurality of parallel spaced hollow fused quartz fibers of at least five meters in length having an organic liquid core of light conducting material and having an index of refraction greater than quartz, said liquid being selected from the group consisting of tetrachloroethylene, and a mixture of carbon tetrachloride and tetrachloroethylene.

2. Device in accordance with claim 1 wherein said liquid is tetrachloroethylene.

3. Device in accordance with claim 1 wherein said liquid is comprised of a mixture of carbon tetrachloride and tetrachloroethylene.

* * * * *